March 26, 1957  E. G. LILL  2,786,321

KNIFE BAR FOR REEL TYPE LAWN MOWER

Filed March 29, 1955

INVENTOR.
ETCHISON G. LILL
BY
Barnes, Kisselle, Laughlin & Raisch
ATTORNEYS.

United States Patent Office 2,786,321
Patented Mar. 26, 1957

2,786,321

KNIFE BAR FOR REEL TYPE LAWN MOWER

Etchison G. Lill, Lansing, Mich., assignor to Motor Wheel Corporation, Lansing, Mich., a corporation of Michigan Application March 29, 1955, Serial No. 497,578

12 Claims. (Cl. 56—289)

This invention relates to lawn mowers, and particularly to lawn mowers of the reel type.

In reel type lawn mowers, the moving blades are mounted on a reel rotatable about a horizontal axis and adapted to cooperate with a fixed knife blade for cutting the grass or weeds. The knife blade is mounted on the housing of the mower by means of brackets on the ends of the blade, the brackets being adjustable to adjust the position of the knife blade relative to the moving blades on the reel. As the lawn mower is used, the center portion of the fixed blade tends to become worn before the ends, primarily because of the fact that the operator usually cuts the lawn by overlapping the paths of the lawn mower. In addition, the knife blade has a tendency to vibrate between the end brackets, causing the center of the knife blade to strike the reel and producing further wear at the center of the knife blade. As the knife blade becomes more dull in the middle portion, the wear is accelerated since the grass becomes wedged between the knife blade and the moving blades on the reel. This produces an abrasive effect, causing further wear on the knife blade. Heretofore, attempts have been made to compenate for the wear in the middle portion of the knife blade by moving the end brackets forcing the ends of the knife blade against the reel. This, of course, is only a partial solution and produces an extremely noisy lawn mower.

A further type of wear experienced with knife blades of reel type lawn mowers is a scalloping caused by the knife blade vibrating in resonance with the reel. When the knife blade vibrates in resonance with the reel, it strikes the moving blades of the reel in the same relative position each time, producing wear at the same points on the knife blade.

It is therefore an object of this invention to provide a knife blade construction wherein adjustment of the knife blade for wear at the center thereof may be accomplished.

Another object of the invention is to provide a knife blade wherein the vibration of the blade intermediate the ends thereof is substantially reduced, thereby preventing the scalloping effect on the blade.

A further object of the invention is to provide such a knife blade wherein these objects are achieved without affecting the adjustment of the ends of the knife blade.

Basically, the invention comprises the provision of a knife blade having a bar extending along the rear edge thereof with the ends of the bar welded to the ends of the blade and with a wedge interposed between the bar and the knife blade at substantially the middle of the bar. A bolt is threaded through the bar to force the wedge against the knife blade and thereby adjust the position of the middle portion of the knife blade.

Figure 1:
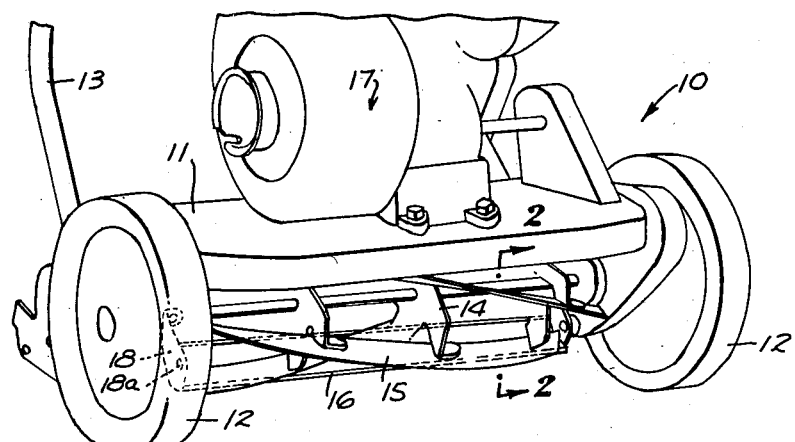
Fig. 1 is a fragmentary perspective view of a reel type lawn mower embodying the invention.

Referring to Fig. 1, a reel type lawn mower 10 may comprise a housing 11 supported on wheels 12 and adapted to be pushed or guided along the ground by a handle 13. The mower includes a reel 14 on which are mounted spiral blades 15 which rotate with the reel and cooperate with a fixed knife blade 16 to cut the grass or weeds. The reel may be rotatable by the movement of the mower along the ground or as shown in Fig. 1 by an internal combustion engine 17.

The knife blade 16 is mounted on the housing 11 of the lawn mower by means of brackets 18 fixed to opposite ends of blade 16 and which are pivotally mounted on the housing as by pins 18a. The pivotal position of the brackets, and therefore knife blade 16, on the housing is adjusted by means of a headed screw 19 extending through a portion of each bracket 18 and threaded into a lug 20 rotatably mounted to the housing. In this manner, the position of each end of the knife blade relative to the moving blades of the reel is adjusted.

Figure 4:
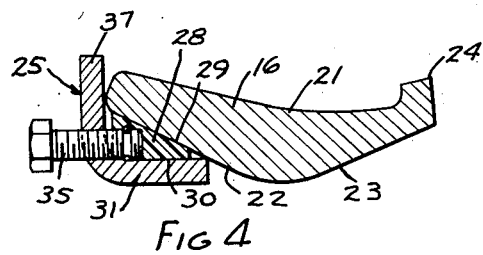
Fig. 4 is an enlarged sectional view along the line 4—4 on Fig. 3.

The knife blade has a cross section as shown in Fig. 4 comprising a generally curved upper surface 21 and outwardly diverging lower surfaces 22, 23, and cutting edge 24 extending longitudinally along the front edge of the blade.

Figure 2:
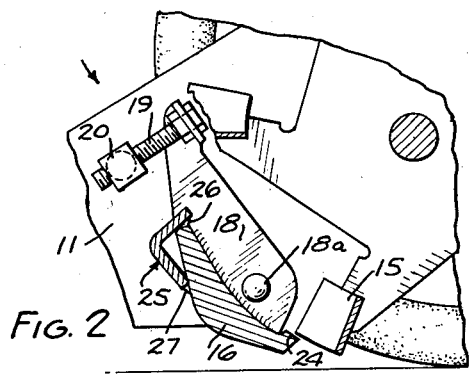
Fig. 2 is an enlarged fragmentary sectional view along the line 2—2 on Fig. 1.
Figure 3:
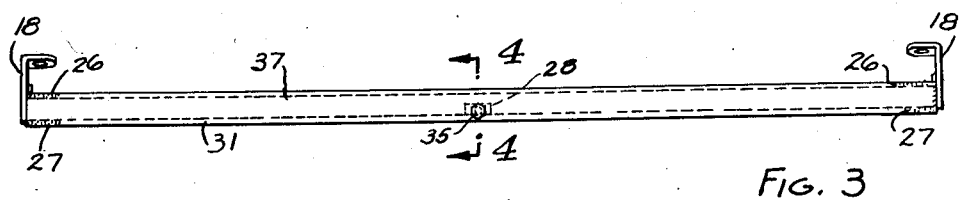
Fig. 3 is an enlarged rear elevational view of the knife blade embodying the invention.
Figure 5:
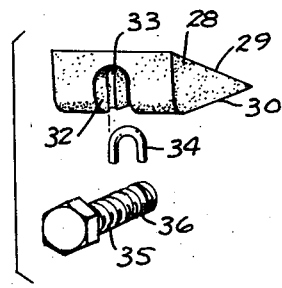
Fig. 5 is an enlarged exploded perspective view of the wedge and bolt utilized in conjunction with the knife blade.

The above construction is typical and conventional in reel type lawn mowers. The improvement comprises providing a bar 25 which is of substantially the same length as the knife blade. The bar 25 is preferably in the form of a right angle. The bar 25 extends longitudinally along the rear side of blade 16 and is welded to the ends of the knife blade at 26, 27, as shown in Figs. 2 and 3.

A wedge 28 is positioned between the knife blade and the bar at approximately the mid-portion thereof and is adapted to be forced against the knife for adjusting the position of the middle portion of the blade. The wedge is preferably made of nylon or the like and includes surfaces 29 and 30 forming an included angle substantially equal to the angle between the surface 22 of the blade and the lower leg 31 of the bar 25. The wedge 28 is provided with a downwardly opening, U-shaped cavity 32 having a U-shaped groove 33 formed therein into which is slipped a U-shaped snap ring or clip 34. A bolt 35 is threaded through the other leg 37 of the bar and is formed with a groove 36 adapted to engage the clip 34 for providing a connection between the wedge 28 and the bar 25 and thereby permitting adjustment of the position of the wedge relative to the knife blade. The lateral dimension of the cavity 32 in the wedge is preferably slightly less than the diameter of the bolt 35 so that the sides of the cavity tightly grip the bolt, thus providing a frictional force on the bolt to prevent the vibration of the bolt out of its adjusted position. The distance between the groove 33 and the inner end of the cavity 32 in the wedge is substantially equal to the distance between the groove 36 in the bolt 35 and the end of the bolt 35. The end of bolt 35 thus bears lightly against the end wall of cavity 32.

The improved knife blade is constructed by first threading the bolt through the bar at the mid-point between the ends thereof, engaging the wedge 28 with the bolt 35 by means of snap ring 34, and thereafter welding the ends of bar 25 to the ends of knife blade 16.

When it is desired to adjust blade 16 relative to blades 15, the initial adjustment is made at each end of blade 16 by turning screws 19 so that each end of the knife blades properly contacts the corresponding ends of the reel blades. Thereafter the center portion of blade 16 is adjusted relative to the mid-portion of the reel blades 15 by turning bolt 35. It will be observed that snap ring 34 provides a connection between wedge 28 and bolt 35 so that the wedge can be forced in a direction away from and pulled toward the leg 37 of bar 25 and thus effect a raising or lowering, respectively, of the cutting edge 24 as desired. In addition, the right angle bar 25 cooperates with the knife blade 16 to form a generally triangular space in which the wedge 28 is placed. The leg 31 of the bar 25 serves to support the wedge 28 while the bolt 35 passes through the other leg 37 of the bar 25.

In the arrangement illustrated the blade 16 is relatively more rigid than the bar 25 and when the bolt 35 is turned to force the wedge against the blade 16, there may be a slight deflection of the bar 25. The resultant force upon the blade 16 is such that the center of the blade is moved upwardly.

Thus, the adjustment of the mid-portion of blade 16 can be effected without disturbing the prior adjustments made at the ends of the blade. As a result, the adjustment of the middle portion of the knife blade can be made to compensate for wear; and, in addition, the scalloping due to vibration of the knife blade is eliminated since the connection of the bar 25 to the knife bar 16 through the welded ends and the wedge 28 dampens out the vibrations of the knife bar 16.

I claim:

1. In a reel type lawn mower, the combination comprising a support on a lawn mower, a knife blade mounted at its opposite ends on said support and having an edge adapted to cooperate with the reel blades of the lawn mower to provide a cutting action, means for adjusting the position of the middle portion of said blade relative to the ends of said blade, said means for adjusting the position of the middle portion of the blade comprising a bar fixedly mounted relative to the ends of said knife blade, and means acting between said blade and said bar for providing a force against the middle portion of the knife blade, said latter means comprising a pressure member and a bolt threaded through an opening in said bar and having an operative connection with said pressure member, said bar being in the form of a right angle, said pressure member being in the form of a wedge adapted to act between one leg of said bar and a surface of the knife blade, said operative connection between the wedge and the bolt comprising a cavity in said wedge, a clip mounted in said cavity, said bolt being formed with a groove adapted to engage the clip.

2. The combination set forth in claim 1 wherein said wedge is made of nylon.

3. The combination set forth in claim 2 wherein the size and shape of the cavity in the wedge and the size and shape of the bolt are such that a frictional contact is provided between the wedge and the bolt for assisting in maintaining the adjusted position of the wedge relative to the knife blade.

4. The combination set forth in claim 2 wherein a lateral dimension of the cavity in the wedge is slightly less than the diameter of the bolt, thereby providing frictional contact between the wedge and cavity for assisting in maintaining the adjusted position of the wedge relative to the knife blade.

5. In a reel type lawn mower, the combination comprising a knife blade adjustably mounted at the ends thereof and adapted to cooperate with the reel of the lawn mower, a bar having the ends thereof rigidly connected directly to the ends of the blade, said bar having a generally right angle cross-section and mounted in such a position with respect to the blade that a cavity of generally triangular shape is formed between the bar and blade, a wedge of rigid plastic material positioned between said bar and blade at the generally middle portion of the blade, and means mounted on said bar for adjusting the position of the wedge relative to the bar and forcing said wedge against said blade to apply a force to the blade for adjusting the position of the middle portion of the knife blade.

6. In a reel type lawn mower, the combination comprising a knife blade adjustably mounted at the ends thereof and adapted to cooperate with the reel of the lawn mower, a bar having the ends thereof rigidly connected relative to the ends of the blade, whereby said blade and bar are movable together relative to said mower, a cam member between said blade and bar and contacting the undersurface of said blade, and means for moving said cam member toward and away from said knife blade thereby adjusting the force exerted by said cam member on the undersurface of said knife blade.

7. The combination set forth in claim 6 wherein said means for moving said cam member comprises a bolt threaded through an opening in said bar and having an operative connection with said cam member.

8. The combination set forth in claim 7 wherein said operative connection between the cam member and the bolt comprises a cavity in said cam member, a clip mounted in said cavity, said bolt being formed with a groove adapted to engage the clip.

9. The combination set forth in claim 8 wherein said cam member is made of plastic material, the size and shape of the cavity in the cam member and the size and shape of the bolt are such that a frictional contact is provided between the cam member and the bolt for assisting in maintaining the adjusted position of the cam member relative to the knife blade.

10. In a reel type lawn mower, the combination comprising a knife blade adjustably mounted at the ends thereof and adapted to cooperate with the reel of the lawn mower, the cross section of said knife blade being such that said knife blade has a generally curved upper surface, outwardly diverging lower surfaces and a cutting edge extending longitudinally along the front edge of the blade, a bar having the ends thereof rigidly connected relative to the ends of the blade whereby said bar and blade are movable together, said bar being positioned adjacent the diverging lower surface of said blade which is furthermost from the cutting edge, a cam member positioned between said bar and blade at the generally middle portion of the blade, and means for adjusting the position of said cam member relative to said bar and forcing said cam member against said blade for adjusting the position of the middle portion of the blade.

11. The combination set forth in claim 10 wherein said bar is in the form of a right angle, said cam member being in the form of a wedge adapted to act between one leg of said bar and said diverging lower surface of the knife blade.

12. The combination set forth in claim 11 wherein said means for adjusting the position of the wedge relative to the bar comprises a bolt threaded through an opening in said bar and having an operative connection with said cam member.

References Cited in the file of this patent

UNITED STATES PATENTS

| | | |
|---|---|---|
| 890,998 | McGuire | June 16, 1908 |
| 2,528,625 | Voytershark et al. | Nov. 7, 1950 |
| 2,601,753 | Zipf | July 1, 1952 |